(12) United States Patent
Lee

(10) Patent No.: US 6,757,024 B2
(45) Date of Patent: Jun. 29, 2004

(54) TIMING RECOVERY APPARATUS AND METHOD FOR DIGITAL TV USING ENVELOPE OF TIMING ERROR

(75) Inventor: Tae Won Lee, Kwangmyung (KR)

(73) Assignee: LG Electronics Inc., Seoul (KR)

( * ) Notice: Subject to any disclaimer, the term of this patent is extended or adjusted under 35 U.S.C. 154(b) by 518 days.

(21) Appl. No.: 09/754,356

(22) Filed: Jan. 5, 2001

(65) Prior Publication Data

US 2002/0001043 A1 Jan. 3, 2002

(30) Foreign Application Priority Data

Jul. 1, 2000 (KR) .......................................... 2000/627

(51) Int. Cl.[7] .............................................. H04N 9/475
(52) U.S. Cl. ........................ 348/512; 348/500; 375/371
(58) Field of Search ................................ 348/512, 500, 348/725, 518; 370/503, 516; 375/315, 376, 375, 371, 373

(56) References Cited

U.S. PATENT DOCUMENTS 6,320,917 B1 * 11/2001 Stott et al. .................. 375/344
6,385,237 B1 * 5/2002 Tsui et al. ................... 375/228
6,441,843 B1 * 8/2002 Limberg ...................... 348/21

* cited by examiner

Primary Examiner—Victor R. Kostak
(74) Attorney, Agent, or Firm—Birch, Stewart, Kolasch & Birch, LLP

(57) ABSTRACT

A timing recovery apparatus and method for a digital TV is disclosed. The timing recovery apparatus includes: a symbol synchronization unit for determining the bandwidth of a timing recovery loop in a plurality of steps according to a convergence degree; and a timing lock detector for detecting a lock using a reference value calculated by the envelope of a timing error, whereby the envelope of the timing error calculated according to a channel state is used as a reference value for thereby preventing a lock error and assuring a rapid and accurate convergence characteristic.

14 Claims, 11 Drawing Sheets

TIMING RECOVERY APPARATUS AND METHOD FOR DIGITAL TV USING ENVELOPE OF TIMING ERROR

BACKGROUND OF THE INVENTION

1. Field of the Invention

The present invention relates to a timing recovery technique, and more particularly, to a timing recovery apparatus and method for a digital TV using the envelope of a timing error calculated according to a channel state.

2. Description of the Background Art

With respect to data transmission of a transmitter in a digital communication apparatus, if a receiver performs sampling at a high or low speed, it reads another value after the sampling, thereby causing an error. Thus, the timing for the transmission rate, transmission time, and interval of each bit at the transmitter side must be the same as the receiver side. That is, in the digital communication apparatus, an output of a demodulator has to be periodically sampled with perfect timing according to a symbol rate to thus be read. In order to perform such a periodical sampling, the receiver receives a clock signal request. This step of extracting a clock signal from the receiver is called as a symbol timing recovery.

The symbol timing recovery can be performed in many ways. In general, a clock used by the transmitter is transmitted along with a data signal. At that time, the timing recovery is easy, but an additional in-frequency band for transmitting clocks are required and a large amount of power is needed. In addition, in a digital TV using a transmission specification of a vestigial sideband transmission system, there is no additional in-clock transmission, and accordingly self-synchronization method for extracting a clock signal from a received signal.

FIG. 1 is a block diagram illustrating a general QAM demodulator. As illustrated therein, the QAM modulator includes: a sampling unit 1 for sampling an input signal by a sampling clock; a multiplier 2 for multiplying an output signal of the sampling unit 1 by a signal of a predetermined frequency outputted from a numerical control oscillator 5 to thus output a baseband signal; a signal processing unit 3 for performing signal processing such as matched filtering upon receipt of the baseband signal outputted from the multiplier 2; a carrier synchronization and channel equalizer 4 for compensating the distortion of the signal outputted from the baseband signal processing unit 3; a numerical control oscillator 5 for outputting a signal of a frequency in order to obtain an accurate baseband signal according to an error detected by the carrier synchronization and channel equalizer 4; a symbol synchronization unit 6 for estimating a proper symbol transition point from the signal inputted from the baseband signal processing unit 3; and a lock detector 7 for detecting a convergence state of the symbol synchronization unit to thus adjust a bandwidth.

Here, the symbol synchronization unit 6 is generally disposed at the front end of a digital receiver, and transfers symbol data synchronized with the symbol to the carrier synchronization and channel equalizer 4 at the rear end. Thus, in order to improve the convergence characteristic of the symbol synchronization unit 6, a high-speed initial synchronization acquisition and a low jitter characteristic in steady state are required. To acquire initial synchronization at a higher speed, the loop bandwidth of a timing recovery loop has to be larger. On the contrary, to obtain a low jitter characteristic in the steady state, the loop bandwidth of the timing recovery loop has to be smaller.

A method of acquiring synchronization by increasing the loop bandwidth of the timing recovery loop at an initial period, and improving a jitter characteristic by decreasing the loop bandwidth, if it is judged that the jitter characteristic is converged to the steady state by the lock detector 7, is called as "gear shifting". In addition, to acquire a rapid and accurate convergence characteristic of the receiver more in engagement with a carrier synchronization unit, information on the convergence state of the timing recovery loop is required. Therefore, the lock detector 7 needs an accurate sensing ability necessary to improve and stabilize the performance of the receiver.

The operation of a conventional symbol synchronization unit and lock detector will now be described with reference to FIGS. 1 and 2.

FIG. 2 is a block diagram illustrating the algorithm principle of a conventional timing lock detector. In the symbol synchronization unit 10, a timing error detector 11 calculates an error from a baseband signal, this error being accumulated on an integrator of a loop filter 12 to control a numerical control oscillator or a voltage control oscillator 13, thereby recovering symbol synchronization. At this time, as illustrated in FIG. 1, since the bandwidth of the timing recovery loop consisting of the sampling unit 1 and the synchronization unit 6 is proportional to the gain of a close loop, the loop bandwidth can be controlled by gradually adjusting the gain of the close loop using the timing lock detector 20. In other words, the timing lock detector 20 obtains a variance 21 of an error(X) accumulated on the integrator of the loop filter 12, and compares the variance 21 with a fixed threshold 22, thereby judging a locking point. A lock signal is delivered from the comparator 23 to a lock controller 24, thereby selecting the loop bandwidth of the close loop.

FIGS. 3A and 3B are graphs illustrating an algorithm principle of a conventional lock detector. In FIG. 3A, the error(X) accumulated on the integrator of the loop filter is converged according to a channel state(SNR), and thereafter the magnitude of a residual jitter becomes inversely proportional to the channel state(SNR) in the steady state. Thus, the variance of the error(X) varies according to the channel state. Therefore, since the hardware cost for calculating the variance is very large, and the variance varies according to the channel state after convergence, the fixed threshold causes the generation of a wrong lock signal, which results in a lock error. With such a lock error, it is made impossible for a large timing frequency and phase offset to be converged, as well as convergence time is lengthened. In addition, although an appropriate threshold can be obtained by using a SNR calculator, the hardware cost for the SNR calculator is increased, and the convergence time of the symbol synchronization unit is lengthened as much as the calculation time of the SNR calculator. Hence, it is impossible to have a high-speed synchronization acquisition convergence characteristic, though it is possible to have a low residual jitter characteristic, thus making it difficult to exhibit the performance of the lock detector.

SUMMARY OF THE INVENTION

Accordingly, it is an object of the present invention to provide a timing recovery apparatus and method for a digital TV by using not a fixed reference value(REF), but the envelope of a timing error calculated according to a channel state(SNR) as a reference value.

It is another object of the present invention to provide a timing recovery apparatus and method for a digital TV in which a timing lock detector performs timing recovery by itself, minimizes the effect between a carrier synchronization recovery and itself in engagement with the carrier synchronization unit, and prevents a lock error.

It is another object of the present invention to provide a timing recovery apparatus and method for a digital TV in which a single lock detector is capable of gradually selecting a loop bandwidth appropriated for a channel state by having a lock counter and an unlock counter.

To achieve the above objects, there is provided a timing recovery apparatus and method for a digital TV according to the present invention, which includes: a symbol synchronization unit for determining the bandwidth of a timing recovery loop in a plurality of steps according to a convergence degree to output a sampling frequency upon receipt of a baseband signal; and a timing lock detector for detecting the convergence state of the symbol synchronization unit and detecting a lock by using a reference value calculated by the envelope of a timing error.

Additional advantages, objects and features of the invention will become more apparent from the description which follows.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
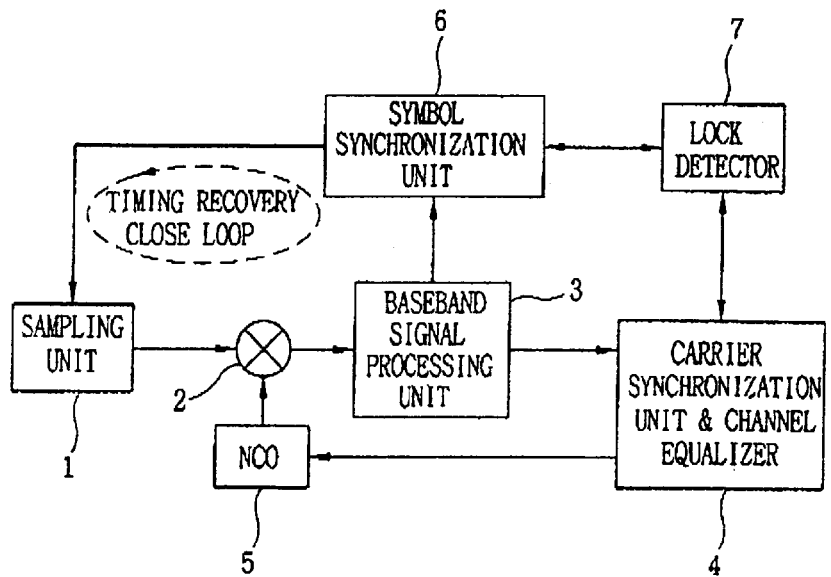
FIG. 1 is a block diagram illustrating the construction of a general QAM demodulator.
Figure 2:
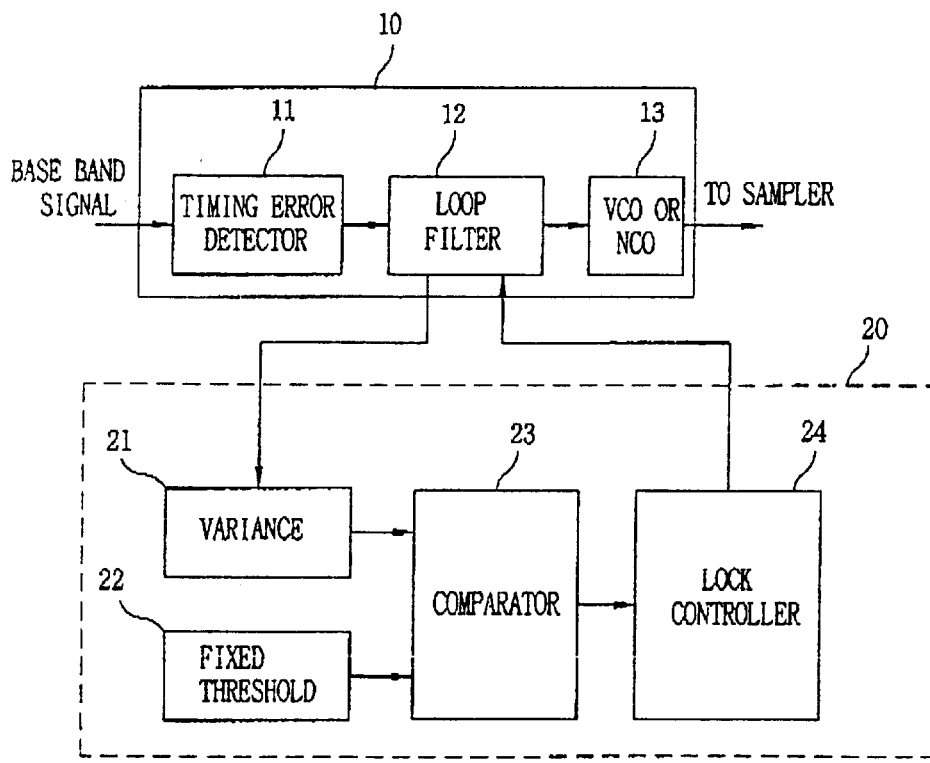
FIG. 2 is a block diagram illustrating a general timing lock detector.
Figure 3A:
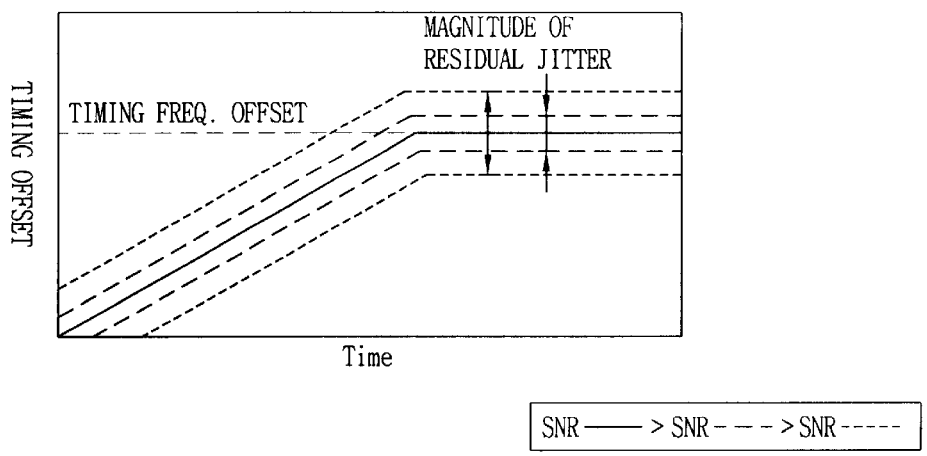
FIG. 3A is a graph illustrating the convergence curve of timing offsets.
Figure 3B:
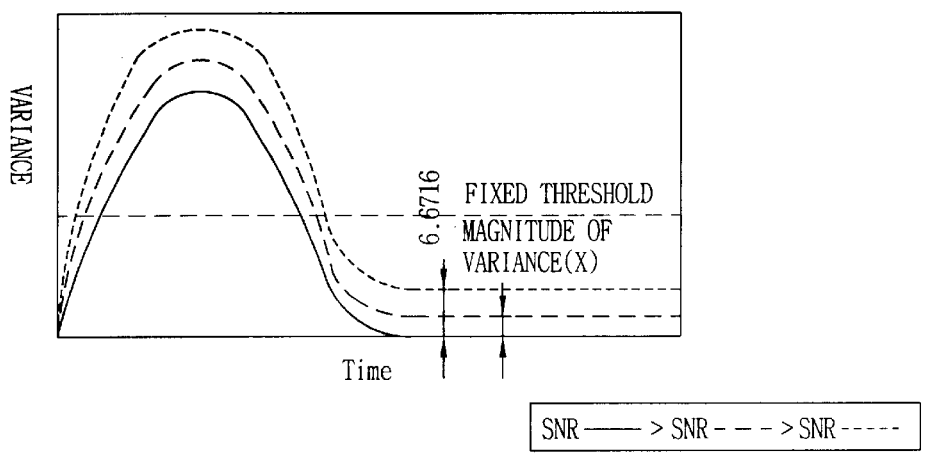
FIG. 3B is a graph illustrating the variance of the convergence curve of timing offsets.
Figure 4:
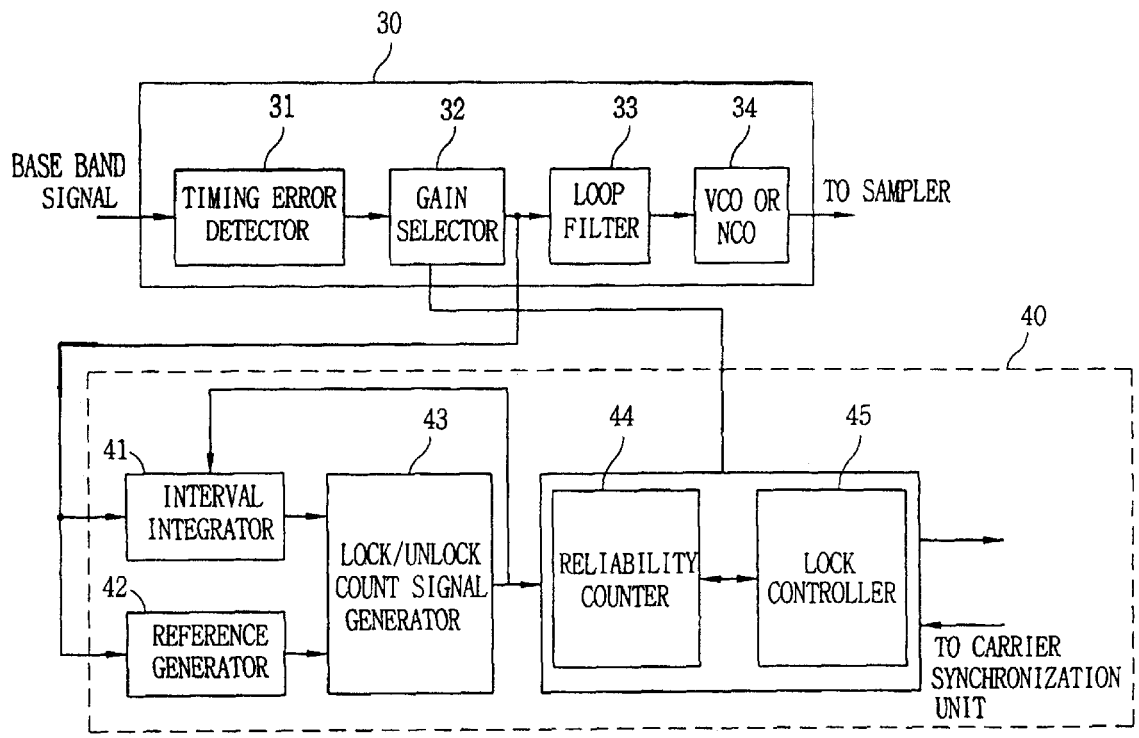
FIG. 4 is a block diagram illustrating the construction of a timing recovery apparatus according to the present invention.

FIG. 4 is a block diagram illustrating the construction of a timing recovery apparatus according to the present invention.

As illustrated therein, the timing recovery apparatus includes: a symbol synchronization unit 30 for determining the bandwidth of a timing recovery loop in a plurality of steps according to a convergence degree upon receipt of a baseband signal to output a sampling frequency; and a timing lock detector 40 for detecting the convergence state of the symbol synchronization unit 30 and detecting a lock using a reference value calculated by the envelope of a timing error.

The symbol synchronization unit 30 includes: a timing error detector 31 for detecting a timing error upon receipt of a baseband signal; a gain selector 32 for selecting a loop gain according to each step upon receipt of the timing error detected from the timing error detector 31 to thus determine a timing recovery loop bandwidth; a loop filter 33 for accumulating the detected error received from the gain selector 32 to thus correct the same; and an oscillating unit 34 for outputting a sampling frequency according to a correction voltage.

In addition, the timing lock detector 40 includes: a reference generator 42 for taking an absolute value for a timing error generated by each symbol, detecting a maximum value for an integration interval, and outputting a reference value two times larger than a gain; an interval integrator 41 for integrating the timing error; a lock/unlock count signal generator 43 for generating a lock or unlock count signal by comparing the reference value outputted from the reference generator 42; a confidence counter 44 for performing counting to each threshold level upon receipt of the lock or unlock count signal, outputting the lock or unlock count signal, and resetting them; and a lock controller 45 for receiving the lock or unlock signal from the confidence counter 44 to output its state to a carrier synchronization unit, or receiving a carrier recovery state from the carrier synchronization unit to use the same in lock detection.

Figure 5:
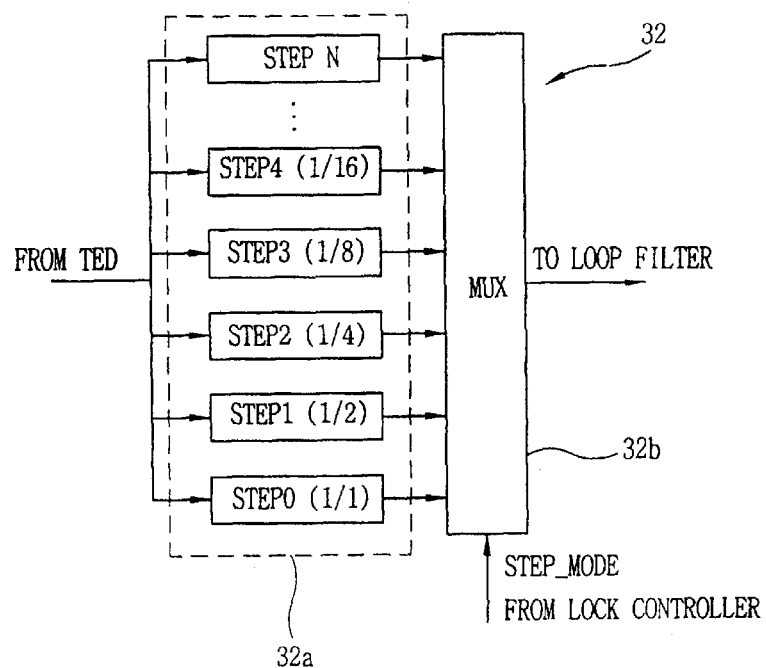
FIG. 5 is a block diagram illustrating the construction of a gain selector in FIG. 4.

Here, the interval integrator 41 is implemented by using a minimum H/W resource of Windows mode. The gain selector 32 as shown in FIG. 5 includes: a gain setter 32a for multiplying a timing error received from the timing error detector 31 by a gain resulted from each gain step to output a resultant value; and a MUX unit 32b for selecting an appropriate loop gain among values of the gain setter 32a by a control signal outputted from the confidence counter 44 and lock controller 45.

Figure 6:
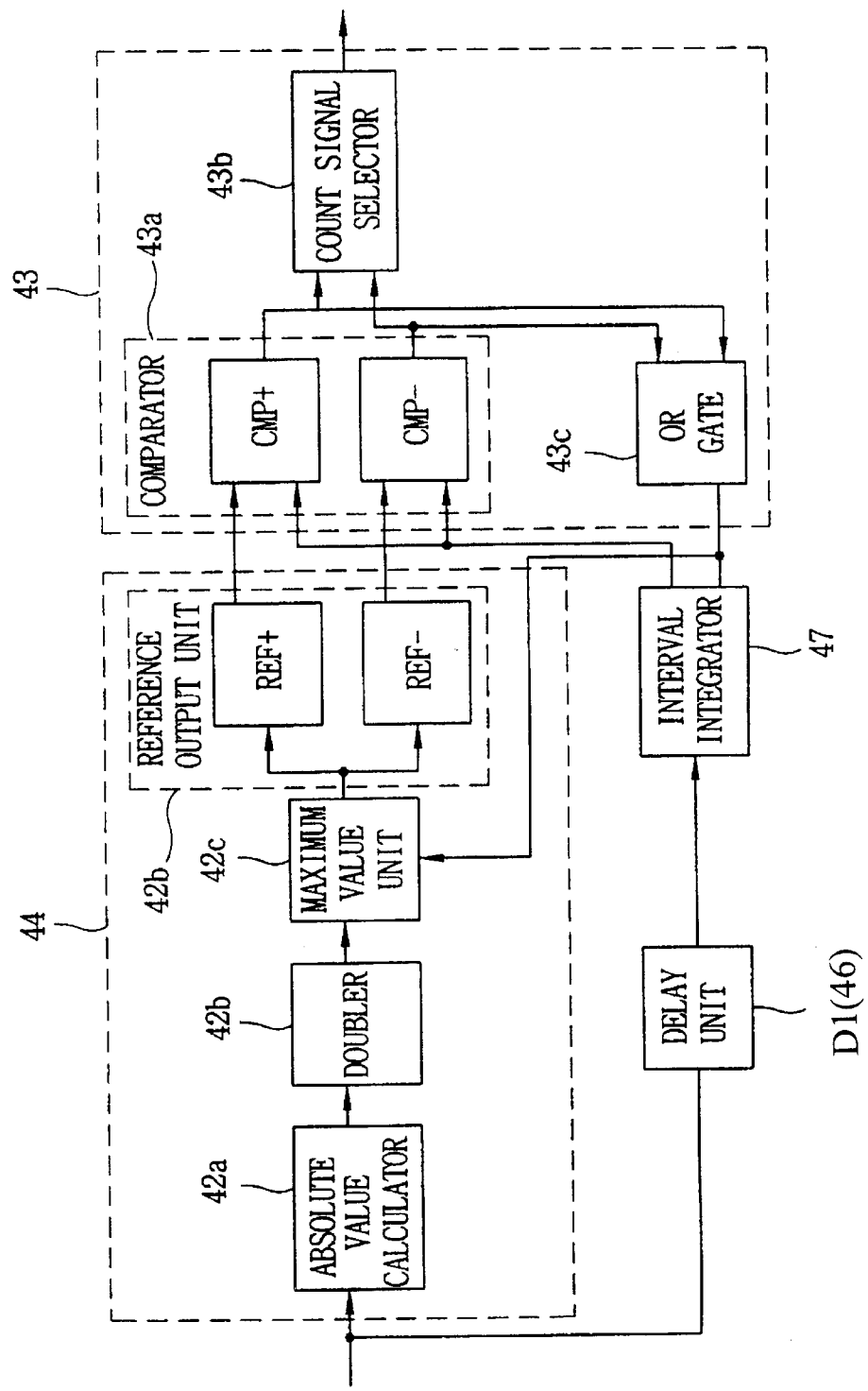
FIG. 6 is a block diagram illustrating the construction of a reference generator and lock/unlock count signal generator in FIG. 4.

FIG. 6 is a block diagram illustrating the construction of the reference generator 42 and the lock/unlock count signal generator 43. The reference generator 42 includes: an absolute value calculator 42a for obtaining an absolute value upon receipt of a timing error(X); a doubler 42b for multiplying the absolute value by 2 to output a resultant value; a maximum value calculator 42c for outputting a maximum value from the resultant value; a reference output unit 42d for outputting a reference value based on the absolute value; a delay unit 46 for delay-outputting the timing error while the reference value of the timing error is determined by each element; and an interval integrator 47 for integrating the timing error outputted from the delay unit 46.

In addition, the lock/unlock count signal generator 43 includes: a comparator 43a for comparing the reference value outputted from the reference output unit 42d with an integer value outputted from the interval integrator 41; a count signal selector 43b for outputting a lock count signal ('0') if the integer value is within the reference value, outputting an unlock count signal('1') if the integer value is more than the reference value, and outputting an unlock count signal('−1') if the integer value is less than the reference value; and an OR gate 43c for resetting a value of the interval integrator and maximum value calculator to '0' if the integer value is out of the range of the reference value or a lock state is changed.

Figure 7:
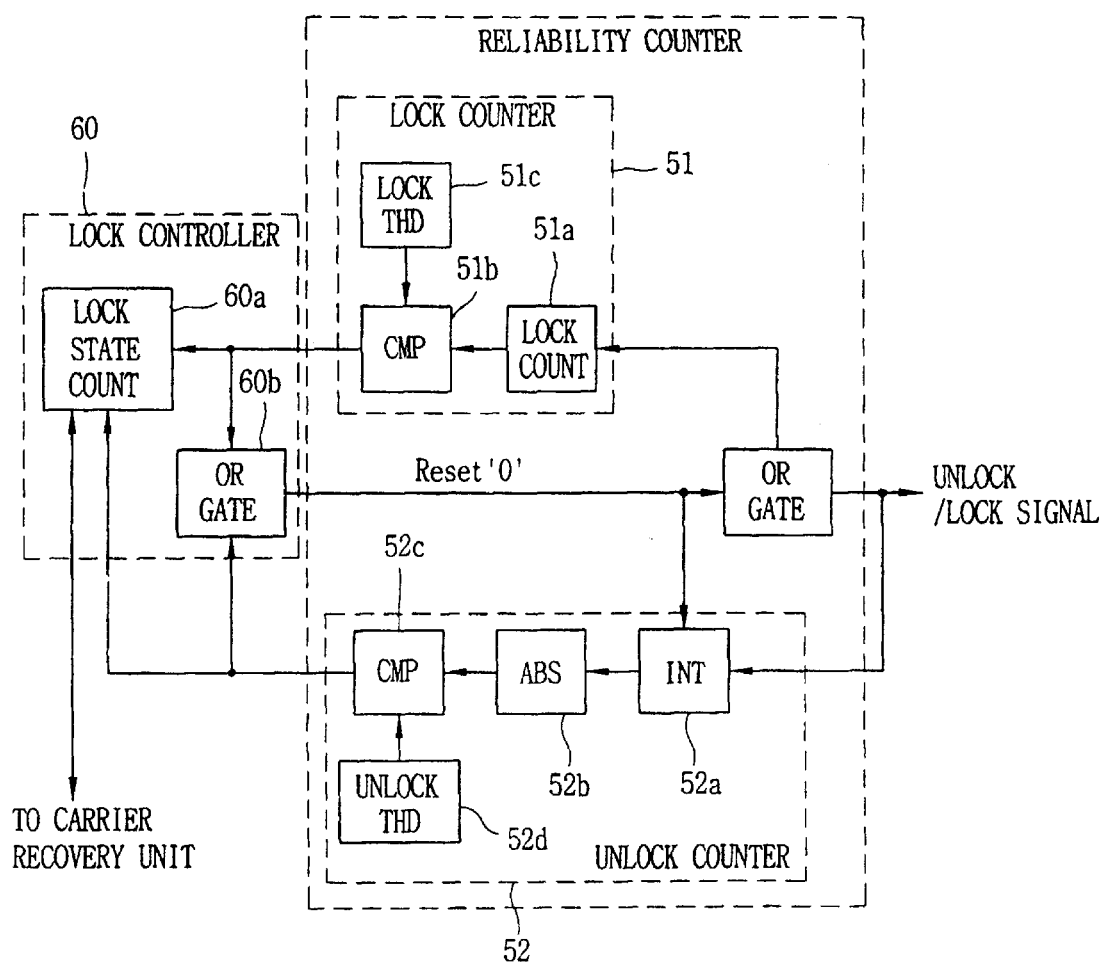
FIG. 7 is a block diagram illustrating the detailed construction of a confidence counter according to the present invention.

FIG. 7 is a block diagram illustrating the detailed construction of the confidence counter 44 according to the present invention. As illustrated therein, the confidence counter 44 includes: a lock counter 51 for receiving a lock count signal from the lock/unlock count signal generator to count the same; an unlock counter 52 for receiving an unlock count signal from the lock/unlock count signal generator to count the same; and a lock controller 60 for outputting a lock state to a carrier synchronization unit according to the lock/unlock signal outputted from the lock counter 51 and unlock counter 52, or receiving a carrier recovery state from the carrier synchronization unit to utilize the same in lock detection. At this time, when a lock/unlock signal is outputted from the lock counter 51 or unlock counter 52, the lock/unlock counter 51 and 52 are reset to start the counters again.

Here, the lock counter 51 includes a lock count unit (LOCK COUNT) 51a for receiving a lock count signal from the lock/unlock count signal generator 43 to count the same; a lock threshold setter(LOCK THD) 51c for setting a lock threshold; and a lock comparator(CMP) 51b for comparing the value outputted from the lock counting unit 51a with the threshold to output a lock to the lock controller 60. In addition, the unlock counter 52 includes: an integrator(INT) 52a for receiving an unlock count signal from the lock/unlock count signal generator 43 to integrate the same; an absolute value output unit(ABS) 52b for taking an absolute value of an integer value by the integrator 52a; an unlock threshold setter(UNLOCK THD) 52d for setting an unlock threshold; and an unlock comparator(CMP) 52c for comparing the value outputted from the absolute value output unit 52b with the threshold to output an unlock count signal to the lock controller 60.

And, the lock controller 60 includes: a lock state output unit(LOCK. STATE COUNT) 60a for changing a timing recovery step upon receipt of a carrier recovery state from the carrier synchronization unit, or outputting the current timing recovery state to the carrier synchronization unit so that carrier recovery is performed according to that state; and an OR gate 60b for ORing the output of the lock counter 51 and unlock counter 52 to output a reset signal(Reset '0').

The operation of the thusly constructed timing recovery apparatus for a digital TV according to the present invention will now be described with reference to FIGS. 8 and 11.

Figure 8A:
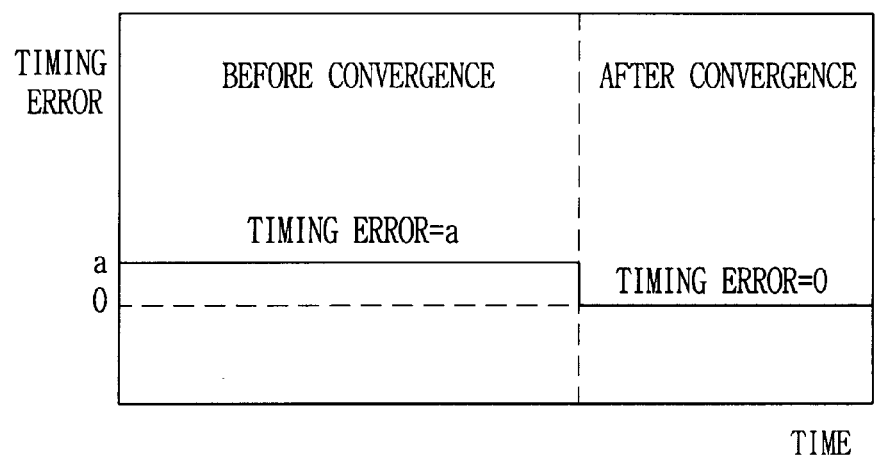
FIGS. 8A and 8B are graphs illustrating a timing error and convergence curve in an ideal case according to the present invention.
Figure 8B:
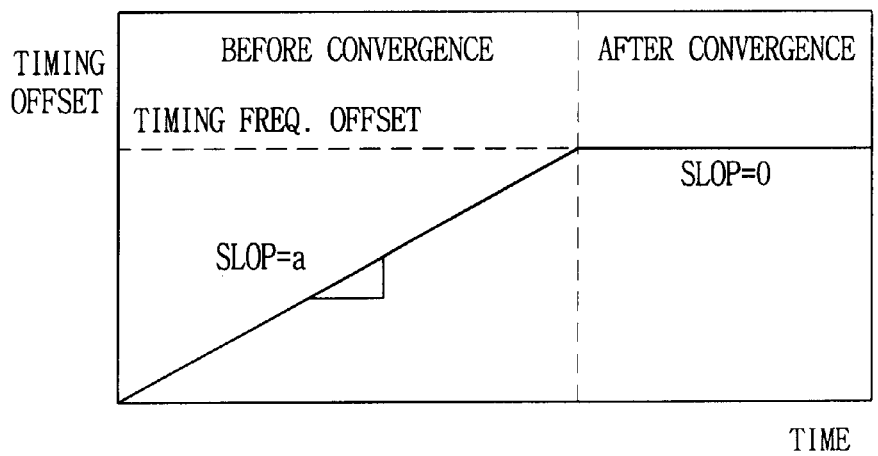
Figure 9A:
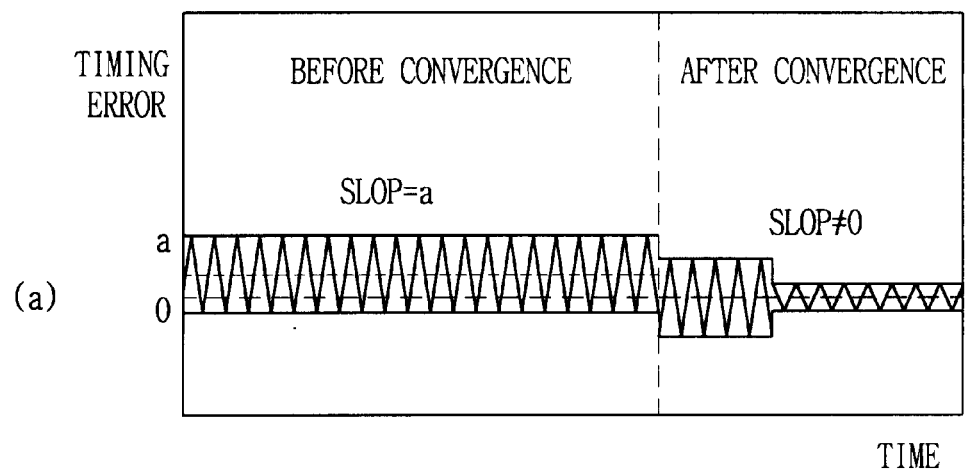
FIGS. 9A and 9B are graphs illustrating a timing error and convergence curve in the case that there is a jitter noise according to the present invention.
Figure 9B:
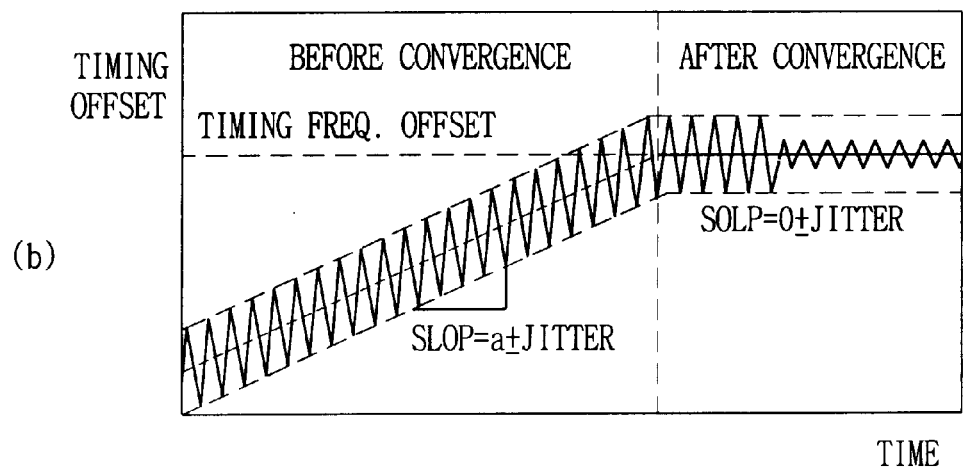

FIGS. 8A and 8B are graphs illustrating a timing error and convergence curve in an ideal case according to the present invention, in which it is very easy to detect a lock, but, in an actual case, it is very difficult to detect a lock because there is a jitter noise as illustrated in FIGS. 9A and 9B.

Figure 10A:
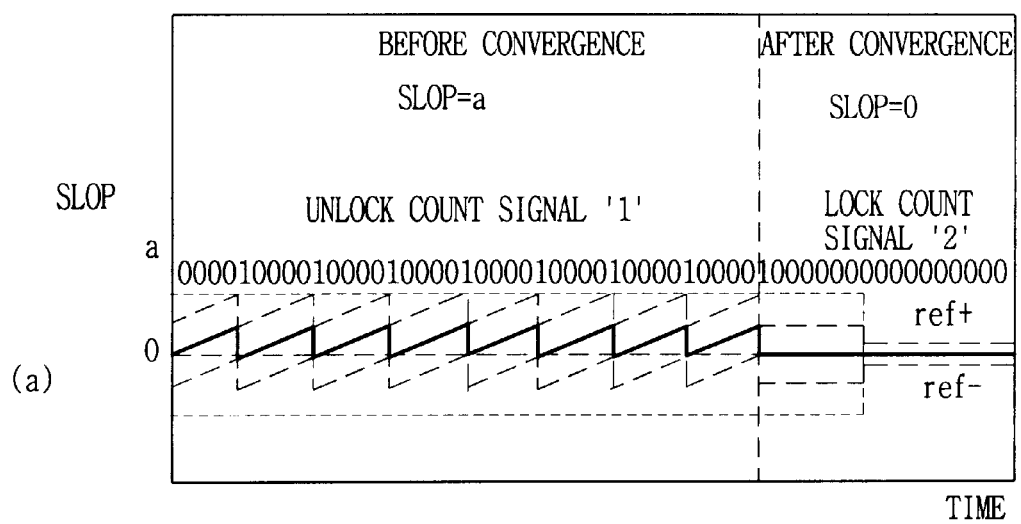
FIGS. 10A and 10B are graphs explaining the algorithm of a timing lock detector according to the present invention.
Figure 11A:
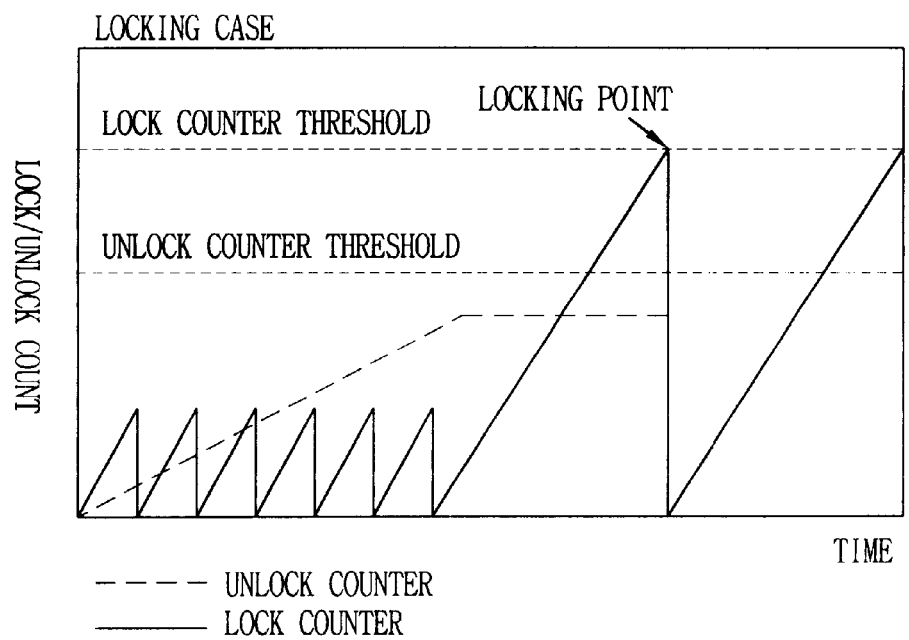
FIGS. 11A and 11B are graphs explaining the operation of a lock/unlock counter according to the embodiment of the present invention.
Figure 11B:
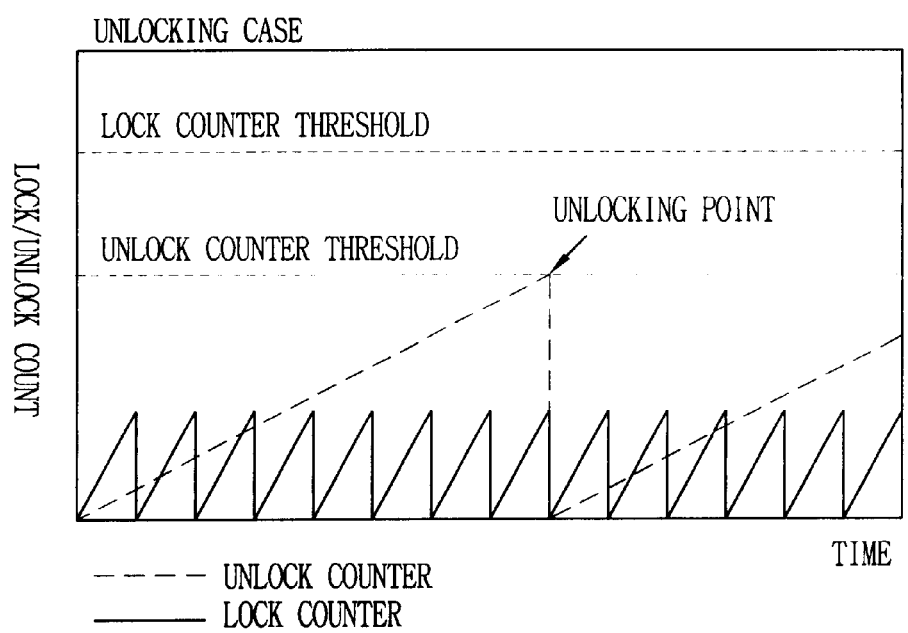

Consequently, in the present invention, as illustrated in FIG. 10A, the value obtained by multiplying the absolute value of the maximum value of a timing error by 2 is set as a reference value(REF+, REF−). If the timing error is within the range of the reference value, a lock .count signal('0') is outputted, or if the timing error is out of the range of the reference value, an unlock count signal('1' or '−1') is outputted. In this way, lock and unlock count signals are continually counted. When an unlock count threshold level is reached by continually accumulating unlock count signals as illustrated in FIG. 11B, the gain selector 32 is controlled to down-adjusting a gain step.

Figure 10B:
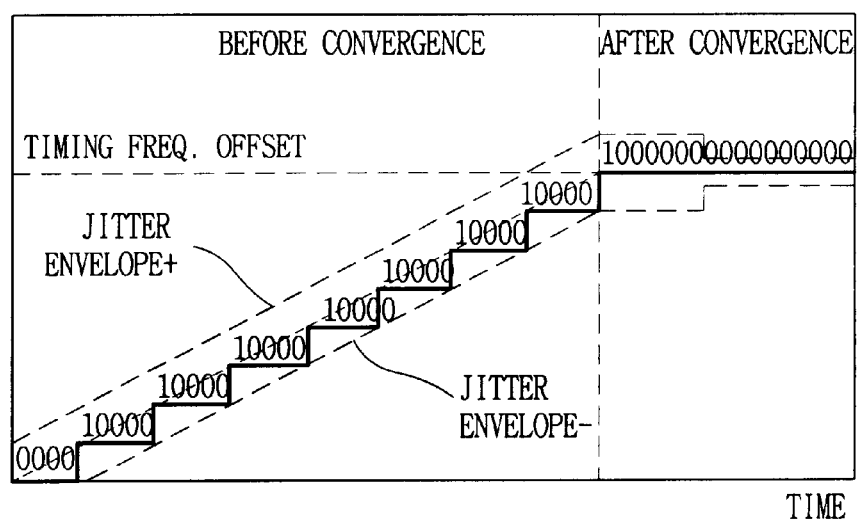

As illustrated in FIG. 10B, a timing offset having a jitter has an envelope of a predetermined slope (a) before convergence, and the slope becomes b 0after convergence. Then, if a lock count signal ('0') is continually outputted as illustrated in FIG. 10A, and a lock count threshold level is reached as illustrated in FIG. 11A, the gain controller 32 is controlled to up-adjust a gain step.

Figure 12:
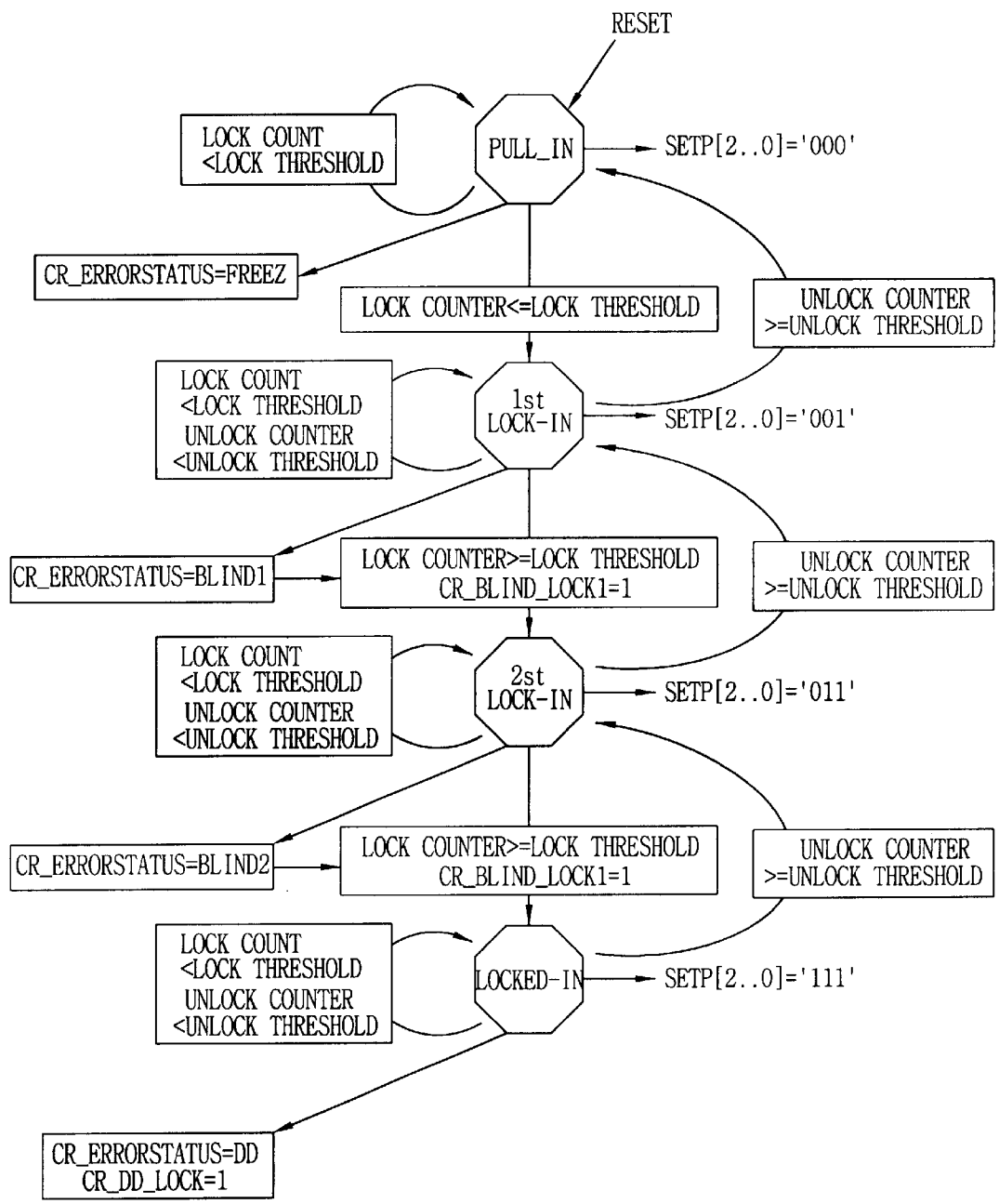
FIG. 12 is a state diagram illustrating a lock control step for timing recovery according to carrier recovery.
Figure 13:
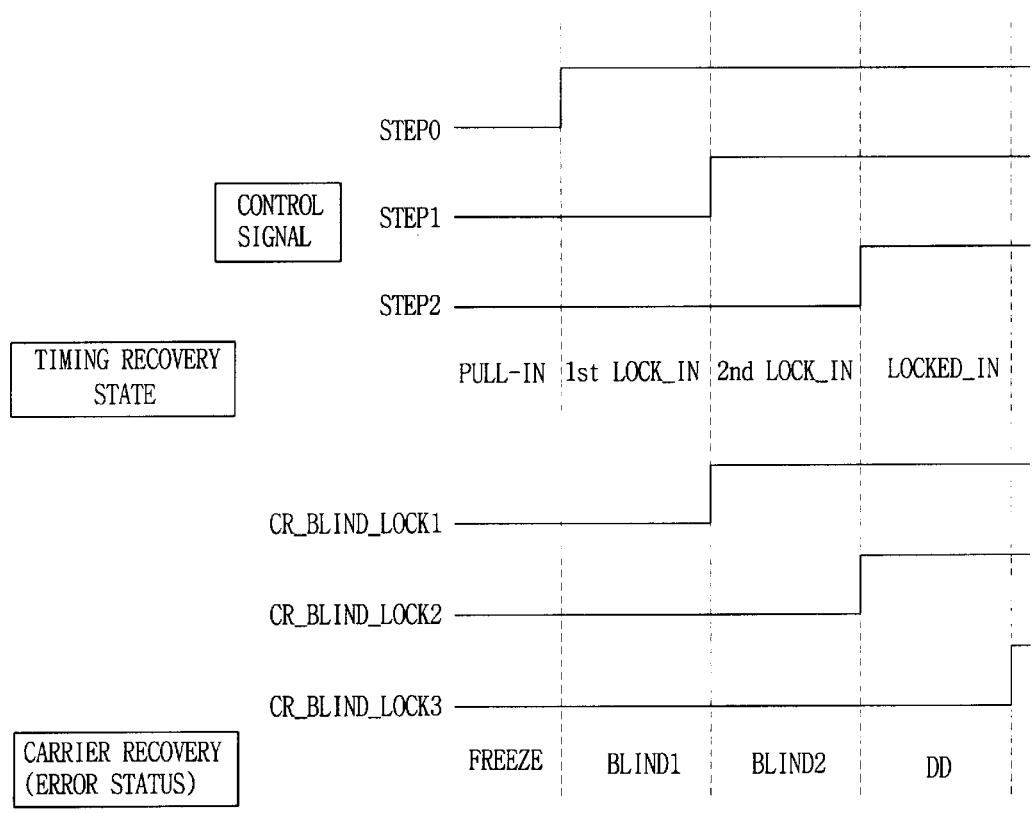
FIG. 13 is a timing diagram illustrating a gear shifting step for timing recovery according to carrier recovery in FIG. 12.

FIG. 12 is a state diagram illustrating a lock control step for timing recovery according to carrier recovery, which will be described with reference to a timing diagram illustrating a gear shifting step for timing recovery according to carrier recovery as in FIG. 13.

As illustrated in FIG. 12, if a lock count reaches a lock threshold level in the pull-in state of timing recovery, the timing recovery state is changed to the 1st Lock-In state by gear-shifting a gain by one step, and the carrier recovery state is changed from Freeze to Blind1. If a lock count reaches a lock threshold level in the 1st Lock-In state, the timing recovery state is changed to the 2nd Lock-In state by gear-shifting a gain, and accordingly the carrier recovery state is changed from Blind1 to Blind2. If the carrier recovery state is shifted by one step, the timing recovery state is also changed from the 2nd Lock-In state to the Locked-In state, and accordingly the carrier recovery state is also changed from Blind2 to DD(decision direct), thereby achieving a carrier lock-in. In other words, timing recovery and carrier recovery are closely connected with each other. Thus, if a timing recovery step is shifted, a carrier recovery step is also shifted by one step, and accordingly the timing recovery step is shifted by one step, thereby enabling an accurate timing recovery and carrier recovery. That is, the timing recovery and the carrier recovery are not achieved independently, but the recovery rate is improved according to their mutual state. Therefore, if a gain step is changed by a step mode, the convergence degree is changed from the Pull-In state to the 1st Lock-In state. In order for each step to be shifted, a lock count has to reach a lock threshold level, and the carrier recovery state has to be also level up. Here, the timing lock detector can be operated by itself, and controls a lock state in engagement with a lock detector of the carrier synchronization unit.

As described above, the timing recovery apparatus for a digital TV according to the present invention can prevent a lock error and obtain a more rapid and accurate convergence characteristic by using the envelope of a timing error calculated according to a channel state, not a fixed reference value(REF), as a reference value. The timing lock detector can perform timing recovery by itself, and can minimize an effect between the carrier synchronization unit and itself in engagement with the carrier synchronization unit and prevent a lock error. The single lock detector can select a loop bandwidth appropriate for a channel state by having a lock counter and an unlock counter, and can be implemented by a minimum HNV resource by using an integrator of the Windows mode.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A timing recovery apparatus for a digital TV, the apparatus comprising:

a symbol synchronization unit for determining the bandwidth of a timing recovery loop in a plurality of steps according to a convergence degree to output a sampling frequency upon receipt of a baseband signal; and a timing lock detector for detecting the convergence state of the symbol synchronization unit and detecting a lock by using a reference value calculated by the envelope of a timing error;

wherein the timing lock detector comprises:

a reference generator for taking an absolute value for a timing error generated by each symbol, detecting a maximum value for an integration interval, and outputting a reference value two times larger than a gain;

an interval integrator for integrating the timing error;

a lock/unlock count signal generator for generating a lock or unlock count signal by comparing the reference value outputted from the reference generator; and a confidence counter for counting each threshold level upon receipt of the lock or unlock count signal, outputting the lock or unlock count signal, and resetting them.

2. The apparatus according to claim 1, wherein the symbol synchronization unit comprises:

a timing error detector for detecting a timing error upon receipt of the baseband signal;

a gain selector for selecting a loop gain according to each step upon receipt of the timing error detected from the timing error detector to thus determine a timing recovery loop bandwidth;

a loop filter for accumulating the detected error received from the gain selector; and an oscillating unit for outputting a sampling frequency according to a correction voltage.

3. The apparatus according to claim 1, wherein the timing lock detector further comprises:

a lock controller for receiving the lock or unlock count signal from the confidence counter to output its state to a carrier synchronization unit, or receiving a carrier recovery state from the carrier synchronization unit to use the carrier recovery state in lock detection.

4. The apparatus according to claim 2, wherein the gain selector comprises:

a gain setter for multiplying the timing error received from the timing error detector by a gain resulted from each gain step to output a resultant value; and a MUX unit for selecting an appropriate loop gain among values of the gain setter by a control signal outputted from the confidence counter and a lock controller.

5. The apparatus according to claim 3, wherein the timing lock detector further comprises a delay unit for delay-outputting a timing error while the reference vale of the timing error is determined.

6. The apparatus according to claim 3, wherein the reference generator comprises:

an absolute value calculator for obtaining an absolute value upon receipt of a timing error;

a doubler for multiplying the absolute value by 2 to output a resultant value;

a maximum value calculator for outputting a maximum value from the resultant value; and a reference output unit for outputting a reference value based on the absolute value.

7. The apparatus according to claim 3, wherein the interval integrator is implemented by a Windows mode.

8. The apparatus according to claim 3, wherein the lock/unlock count signal generator comprises:

a comparator for comparing the reference value outputted from the reference output unit with an integer value outputted from the interval integrator;

a count signal selector for outputting a lock count signal ('0') if the integer value is within the reference value, outputting an unlock count signal ('1') if the integer value is more than the reference value, and outputting an unlock count signal ('−1') if the integer value is less than the reference value;

a logic gate for resetting a value of the interval integrator and maximum value calculator to '0' if the integer value is out of the range of the reference value or a lock state is changed.

9. The apparatus according to claim 3, wherein the confidence counter comprises:

a lock counter for receiving a lock count signal from the lock/unlock count signal generator to count the lock count signal; and an unlock counter for receiving an unlock count signal from the lock/unlock count signal generator to count the unlock count signal.

10. The apparatus according to claim 9, wherein the lock controller comprises:

a lock state output unit for changing a timing recovery step upon receipt of the carrier recovery state from the carrier synchronization unit, or outputting the current timing recovery state to the carrier synchronization unit so that carrier recovery is performed according to that state; and a logic gate for ORing the output of the lock counter and the unlock counter to output a reset signal (Reset '0').

11. A timing recovery method for a digital TV, the method comprising the steps of:

outputting a reference value from a timing error generated by each symbol;

integrating a timing error by an interval integrator to output an integer value;

comparing the reference value with the integer value to generate a lock/unlock count signal;

counting each threshold level upon receipt of the lock or unlock count signal, outputting the lock or unlock count signal, and resetting them by using a confidence counter; and receiving the lock or unlock count signal from the confidence counter to output its state to a carrier synchronization unit, or receiving a carrier recovery state from the carrier synchronization unit to use the carrier recovery state in lock detection by using a lock controller;

wherein, when a timing recovery is shifted, a carrier recovery is shifted by one step, and the timing recovery is shifted by one step.

12. The method according to claim 11, wherein the reference value uses the envelope of a timing error calculated according to a channel state(SNR).

13. The method according to claim 11, wherein the timing recovery according to the carrier recovery is operated by a timing lock detector, and the timing lock detector controls, a lock state in engagement with a lock detector of the carrier synchronization unit.

14. A timing recovery method for a digital TV, the method comprising the steps of:

detecting a timing error from a timing error detector upon receipt of a baseband signal;

selecting a loop gain from a gain selector based on the detected timing error;

outputting a reference value from a timing error generated by each symbol;

integrating a timing error by an interval integrator to output an integer value;

comparing the reference value with the integer value to generate a lock/unlock count signal;

counting each threshold level upon receipt of the lock or unlock count signal, outputting the lock or unlock count signal, and resetting them by using a confidence counter;

receiving the lock or unlock count signal from the confidence counter to output its state to a carrier synchronization unit, or receiving a carrier recovery state from the carrier synchronization unit to use the carrier recovery state in lock detection by using a lock controller;

accumulating the detected error received from the gain selector to thus correct the same by using a loop filter; and outputting a sampling frequency according to a correction value.

* * * * *